(12) United States Patent
Sawa et al.

(10) Patent No.: US 7,951,494 B2
(45) Date of Patent: May 31, 2011

(54) SOLID ELECTROLYTE WITH HIGH ION-CONDUCTIVITY AND METHOD FOR MANUFACTURING THE SAME, AND ELECTROCHEMICAL SYSTEM USING SOLID ELECTROLYTE

(75) Inventors: Haruo Sawa, Kochi (JP); Haruyuki Nakanishi, Toyota (JP); Shinichi Matsumoto, Toyota (JP)

(73) Assignees: Nippon Kodoshi Corporation, Kochi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 75 days.

(21) Appl. No.: 12/165,860

(22) Filed: Jul. 1, 2008

(65) Prior Publication Data

US 2009/0068531 A1    Mar. 12, 2009

(30) Foreign Application Priority Data

Jul. 2, 2007   (JP) .................. 2007-174589

(51) Int. Cl.
*H01M 6/18*   (2006.01)
*G01N 27/26*  (2006.01)
(52) U.S. Cl. ........ 429/307; 429/188; 429/304; 429/305; 429/306; 429/314; 429/317; 429/324; 429/326; 429/339; 429/344; 429/491; 204/421
(58) Field of Classification Search ............. 429/33, 429/188, 304–307, 314, 317, 324–326, 339, 429/344, 491; 204/421
See application file for complete search history.

(56) References Cited

U.S. PATENT DOCUMENTS 5,401,408 A * 3/1995 Umemura et al. ............ 204/631
6,183,914 B1 * 2/2001 Yao et al. ..................... 429/309

FOREIGN PATENT DOCUMENTS

| JP | 11-139128    | 11/2000 |
| JP | 2002-525803  | 8/2002  |
| JP | 2002-035832  | 8/2003  |
| JP | 2002-310093  | 5/2004  |
| JP | 2003-432339  | 8/2004  |
| JP | 2003-082202  | 10/2004 |
| JP | 2003-139969  | 12/2004 |

OTHER PUBLICATIONS

Translation of JP 2004333422 (Already of record).*
Electrochemistry, 69 No. 3, p. 154-159 (2001).
Optical Switching of Y-Hydride Thin Film Electrodes, p. 3348-3353.

* cited by examiner

Primary Examiner — Patrick Ryan
Assistant Examiner — Ladan Mohaddes
(74) Attorney, Agent, or Firm — Berenato & White, LLC

(57) ABSTRACT

The present invention provides a solid electrolyte with high ion-conductivity which is cheap and exhibits high conductivity in an alkaline form, and stably keeps high conductivity because of a small amount of the leak of a compound bearing conductivity even in a wet state. The invention is useful in an electrochemical system using the solid electrolyte, such as a fuel cell.

The solid electrolyte with high ion-conductivity comprises a hybrid compound which contains at least polyvinyl alcohol and a zirconic acid compound, and also a nitrogen-containing organic compound having a structure of amine, quaternary ammonium compound and/or imine, obtained by hydrolyzing a zirconium salt or an oxyzirconium salt in a solution including water, polyvinyl alcohol, a zirconium salt or an oxyzirconium salt and a nitrogen-containing organic compound having a structure of amine, quaternary ammonium compound and/or imine coexist, removing a solvent and contacting with alkali.

15 Claims, 2 Drawing Sheets

Primary amine     Secondary amine     Tertiary amine (A)

Quaternary ammonium ion (B)

Imine (C)

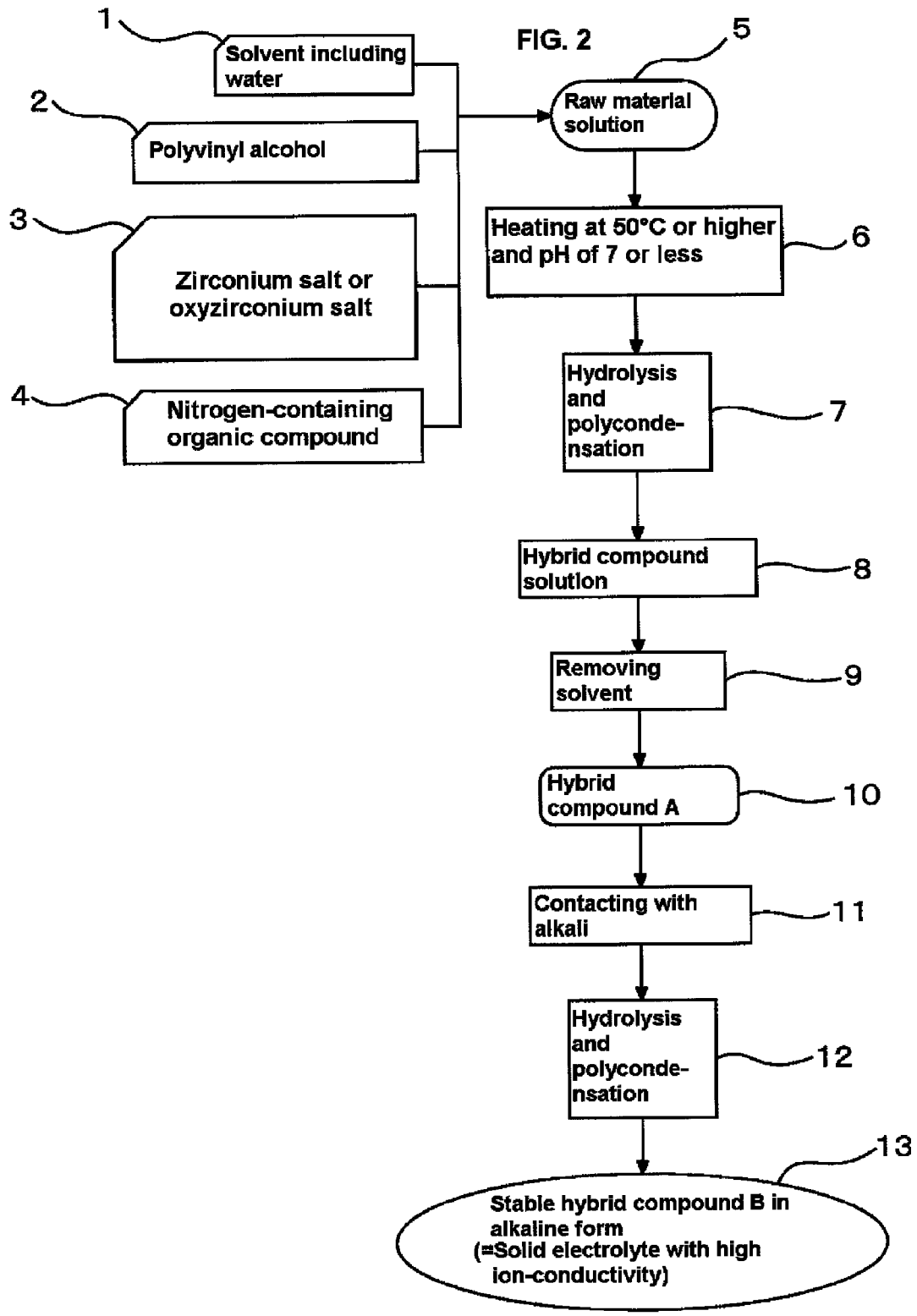

SOLID ELECTROLYTE WITH HIGH ION-CONDUCTIVITY AND METHOD FOR MANUFACTURING THE SAME, AND ELECTROCHEMICAL SYSTEM USING SOLID ELECTROLYTE

BACKGROUND OF THE INVENTION

1. Field of the Invention

The present invention relates to a solid electrolyte with high ion-conductivity of protons (hydrogen ions), hydroxide ions, and the like which is cheap and exhibits high conductivity even in an alkaline form, and also can stably keep high conductivity because of a small amount of the leak of a compound bearing conductivity even in a wet state, a method for manufacturing the same, and an electrochemical system using the solid electrolyte, such as a fuel cell.

2. Description of the Related Art

Conventionally, electrolytic devices such as fuel cells, dehumidifiers, and electrolytic hydrogen-producing devices have been practically used as electrochemical systems employing a proton-conducting solid electrolyte. In particular, the applications of proton-conducting solid electrolytes which operate at room temperature are wide-ranging. For example, in a solid polymer fuel cell, current flows and electric energy is obtained by an electrochemical oxidative reaction of hydrogen supplied to a negative electrode shown by the following formula (1), an electrochemical reductive reaction of oxygen supplied to a positive electrode shown by formula (2), and a reaction based on proton transfer in the electrolyte between the positive electrode and the negative electrode.

$$H_2 \rightarrow 2H^+ + 2e^- \quad (1)$$

$$1/2 O_2 + 2H^+ + 2e^- \rightarrow H_2O \quad (2)$$

Although there are direct methanol-type fuel cells in which methanol is the fuel supplied to the negative electrode and fuel cells using substances other than hydrogen or methanol as the fuel supplied to the negative electrode, in these cases also, the fuels are electrochemically oxidized at the negative electrode to release protons in a similar manner. Thus, it is possible to operate by using the proton-conductive solid electrolyte.

Electrolytic hydrogen-producing devices, for example, are practically used as electrolytic devices. Electrolytic hydrogen-producing devices produce hydrogen on the basis of a reaction opposite to the above-mentioned formulae (1) and (2) in a fuel cell and have the advantage that a hydrogen gas is unnecessary since it is possible to obtain high-purity hydrogen on-site by using only water and electric power. Also, by using a solid electrolyte, it is possible to easily carry out electrolysis only by the introduction of pure water including no electrolyte. In the paper industry, the on-site manufacture of hydrogen peroxide for bleach by a similar system has been attempted by an electrolytic method using the following formula (3) (refer to Electrochemistry, 69, No. 3, 154 to 159 (2001)).

$$O_2 + H_2O + 2e^- \rightarrow HO_2^- + OH^- \quad (3)$$

Dehumidifiers have a structure in which the proton-conducting solid electrolyte film is sandwiched between the positive electrode and the negative electrode, similar to fuel cells or the hydrogen-producing devices. When a voltage is applied between the positive electrode and the negative electrode, water is split into protons and oxygen at the positive electrode by the reaction in the following formula (4). The protons, which have moved through the solid electrolyte to the negative electrode, bind with oxygen in the air to form water again by the reaction of formula (5). As a result of these reactions, dehumidification is carried out at the positive electrode by water transfer from the positive electrode to the negative electrode.

$$H_2O \rightarrow 1/2 O_2 + 2H^+ + 2e^- \quad (4)$$

$$1/2 O_2 + 2H^+ + 2e^- \rightarrow H_2O \quad (5)$$

It is also possible to split water and to dehumidify by an operation principle similar to electrolytic hydrogen-producing devices. Also, an air conditioner combined with a moisture evaporation cold air device has been proposed (refer to Collected papers of the 2002 National Meeting of the Institute of Electrical Engineers, P3373 (2000)).

Various kinds of sensors, electrochromic devices, and the like are systems based on an operation principle essentially similar to that mentioned above. It is possible to use a proton-conducting solid electrolyte since these systems operate by the transfer of protons through the electrolyte between two kinds of different redox pairs of positive and negative electrodes. Presently, an experimental study with respect to these systems using proton-conducting solid electrolytes is being carried out.

For hydrogen sensors, for example, the variation of electrode potential dependent on the hydrogen concentration when hydrogen is introduced in the reactions of the above-mentioned formulae (4) and (5) can be used. Furthermore, using the variation of electrode potential or the variation of ion conductivity, it is also possible to apply to a humidity sensor.

When a substance such as $WO_3$ is employed as the negative electrode and an electric field is applied to it, the electrochromic device makes a color on the basis of the reaction of the following formula (6) and can be used in displaying devices and lightproof glass. This system is also operated by donating and accepting protons for the negative electrode, and it is possible to use the proton-conductive solid electrolyte.

$$WO_3 + xH^+ + xe^- \rightarrow H_xWO_3 \text{ (Coloring)} \quad (6)$$

Primary batteries, secondary batteries, optical switches, and electrolyzed water-manufacturing devices can be given as examples of other electrochemical systems which are considered to operate by using a proton-conducting solid electrolyte according to their mechanism. For nickel hydride batteries, as an example of the secondary batteries, a hydrogen-absorbing alloy is used as the negative electrode, a nickel hydroxide is used as the positive electrode, and alkaline electrolytic solution is used as the electrolytic solution. As shown by the following formulae (7) and (8), at charging and discharging, electrochemical reduction and oxidation of the proton occurs at the negative electrode, and hydrogen is stored in the hydrogen-absorbing alloy.

$$\text{(Charging) } H_2O + e^- \rightarrow H \text{ (Absorbing)} + OH^- \quad (7)$$

$$\text{(Discharging) } H \text{ (Absorbing)} + OH^- \rightarrow H_2O + e^- \quad (8)$$

As shown by the following formulae (9) and (10), the electrochemical oxidation and reduction of the nickel hydroxide occurs.

$$\text{(Charging) } Ni(OH)_2 + OH^- \rightarrow NiOOH + H_2O + e^- \quad (9)$$

$$\text{(Discharging) } NiOOH + H_2O + e^- \rightarrow Ni(OH)_2 + OH^- \quad (10)$$

The charging and discharging reactions of this battery are conducted by the proton or the hydroxide ion moving in the electrolyte. Although it is possible to use the proton-conducting solid electrolyte according to its mechanism, alkaline electrolytic solution, which is not a solid electrolyte, is usually conventionally used.

An optical switch using yttrium as the negative electrode has been proposed (refer to J. Electrochem. Soc., Vol. 143, No. 10, 3348 to 3353 (1996)). When an electric field is applied thereto, the yttrium is hydrogenated as shown in the formula (11) to allow light to pass therethrough. As a result, it is possible to switch between transmission and nontransmission of light by the electric field. Although it is possible to use the proton-conductive solid electrolyte in this system, alkaline electrolytic solution is used in the prior art.

$$Y+3/2H_2O+3e^- \rightarrow YH_3+3OH^- \qquad (11)$$

Electrolyzed water is water which is produced by an electrolysis reaction. Although efficacy is depending on the reduction side or the oxidation side, the electrolyzed water has a healthful effect, a bactericidal effect, a detergent effect, and an effect of promoting the growth of farm products. It is possible to use as drinking water, water for food preparation, cleaning water, agricultural water, and the like. Although the electrolysis reaction is promoted when water includes an electrolyte, however, in some cases, the electrolyte as a solute in water is needed to be removed. When a solid electrolyte is used as the electrolyte, it is unnecessary to remove the solid electrolyte from the water.

In many of the above-mentioned electrochemical systems such as fuel cells, electrolytic devices, and dehumidifiers, which have already been put to practical use, a perfluorosulfonic acid membrane sold under the tradename of Nafion by DuPont is employed as a solid electrolyte. Also, the applicant of the present application has already provided solid electrolytes comprising an inorganic/organic hybrid compound of a zirconic acid compound and polyvinyl alcohol (refer to Japanese Unexamined Patent Publication (Kokai) No. 2003-242832; and Japanese Unexamined Patent Publication (Kokai) No. 2004-146208). Furthermore, for these solid electrolytes, a casting method, which is the method for forming membrane by casting an aqueous raw material solution on a flat plate and removing the water of the solvent by heating, is applied. (refer to Japanese Unexamined Patent Publication (Kokai) No. 2004-285458). These hybrid compounds can be prepared by neutralizing a zirconium salt or an oxyzirconium salt with alkali in the situation in which polyvinyl alcohol coexists and exhibit comparatively high proton (hydroxide ion) conductivity by impregnating with alkali such as sodium hydroxide, sodium silicate, or sodium carbonate.

The applicant of the present application provides means for more satisfactorily manufacturing these solid electrolytes, through the steps of heating a solution in which a solvent including water, polyvinyl alcohol, and a zirconium salt or an oxyzirconium salt coexist at 50° C. or higher and pH of 7 or less to hydrolyze the zirconium salt or the oxyzirconium salt; removing the solvent; and contacting the solution with alkali (refer to Japanese Patent Application No. 2007-84374).

On the other hand, an anion-exchange membrane functions as a hydroxide ion conductive material and has conventionally been used. For example, an anion-exchange membrane as an electrolyte for a fuel cell (refer to Japanese Unexamined Patent Publication (Kokai) No. 2000-331693) and an anion-exchange membrane containing an inorganic filler added therein are provided (refer to Japanese Unexamined Patent Publication (Kokai) No. 2004-217921). As a polymer electrolyte, composition comprising a nitrogen-containing organic compound and a metal hydroxide (refer to Japanese Unexamined Patent Publication (Kokai) No. 2002-525803), or a conventional polymer solid electrolyte film comprising inorganic fine particles, an electrolyte salt and a polymer, which does not necessarily have hydroxide ion conductivity, is disclosed (refer to Japanese Unexamined Patent Publication (Kokai) No. 2004-339422).

SUMMARY OF THE INVENTION

However, the above-mentioned perfluorosulfonic acid electrolyte membranes have a problem of being costly mainly due to the complexity of the manufacturing process. Furthermore, there is a drawback that reducing the cost of the entire system is difficult since materials that can be used for electrode and other parts constituting the system are limited to acid-resistant materials such as noble metals as a result of high acidity of the electrolyte membranes. Also, there is a problem that an acidic solid electrolyte cannot be used in some applications such as primary batteries, secondary batteries, and the like, since the electrode active material cannot exist stably or does not function if it is not in alkali.

In contrast, in the solid electrolyte comprising an inorganic/organic hybrid compound of a zirconic acid compound and polyvinyl alcohol according to Japanese Unexamined Patent Publication (Kokai) No. 2003-242832, Japanese Unexamined Patent Publication (Kokai) No. 2004-146208 and Japanese Patent Application No. 2007-84374 provided by the applicant of the present application, water resistance, heat resistance, oxidation resistance and alkali resistance of cheap polyvinyl alcohol can be remarkably improved by hybridizing with a zirconic acid compound at a molecular level using the above-mentioned simple method, and thus a solid electrolyte with high performance can be obtained at low cost. According to Japanese Patent Application No. 2007-84374, it is possible to prohibit gelation of the raw material solution with keeping the concentration of the raw material solution of the solid electrolyte desirable for efficient manufacture of membranes.

Since these solid electrolytes functions even in an alkaline form, they can be applied to primary batteries, secondary batteries and the others in which solid electrolytes are used in alkali. It is not always necessary that electrodes and other peripheral members are made of an expensive noble metal, thus contributing to cost reduction of the entire system. Moreover, since polyvinyl alcohol having the highest gas shielding properties among polymers is hybridized with inorganic oxide with closer-packing structure, very high shielding properties against substance permeation can be realized, and there is a large merit in applications which require high shielding properties against substance permeation, for example, fuel cells.

However, defects of these solid electrolytes are that sufficiently high conductivity cannot be obtained until an alkaline component is absorbed by immersion and that the alkaline component is not fixed in the solid electrolyte in a sufficiently stable state. For example, if the solid electrolytes are used in a highly wet environment, like a fuel cell, in which produced water is discharged out of the system one after another, the absorbed alkaline agent in the solid electrolyte may also be discharged with the produced water by dissolving into it. In that case, the concentration of the alkaline agent in the solid electrolyte gradually decreases to cause a problem of decrease in conductivity. Although conductivity can be kept by always supplying the discharged alkaline agent, it makes the system complicated.

On the other hand, any anion-exchange membrane is a nitrogen-containing organic compound prepared by adding a quaternary ammonium salt to an organic polymer frame, and hydroxide ion conductivity is exhibited by basification. In these compounds, a nitrogen moiety having hydroxide ion conductivity is bonded and fixed to the polymer frame. Therefore, the leak of the nitrogen moiety from the ion exchange membrane does not occur. However, unlike the substance mentioned above, since a conventional anion-exchange membrane is not made of a hybrid compound with an inorganic oxide at a molecular level but is based on a conventional organic polymer, heat resistance and oxidation resistance are limited to a certain level. If a fluorine polymer is used as a frame polymer so as to improve chemical stability, the cost increases. As long as the organic polymer is used as a frame polymer, high shielding properties against substance permeation cannot be obtained, like the above-mentioned inorganic/organic hybrid compound electrolyte, because the organic polymer does not have close-packing structure.

For example, in an anion-exchange membrane disclosed in Japanese Unexamined Patent Publication (Kokai) No. 2000-331693, a fluorine polymer is used as a frame polymer and it makes the anion-exchange membrane chemically very stable but more expensive than the above-mentioned inorganic/organic hybrid compound electrolyte. The anion-exchange membrane does not have high shielding properties against substance permeation, since it does not have close-packing structure like the inorganic/organic hybrid compound electrolyte. In an anion-exchange membrane containing an inorganic filler added therein disclosed in Japanese Unexamined Patent Publication (Kokai) No. 2004-217921, a mixture can be obtained by physically mixing a polymer of a conventional anion-exchange membrane with an inorganic matter. However, since polymer has low affinity to the inorganic matter and it is difficult to hybridize at a molecular level only by mixing physically, it is difficult to improve performance depending on properties at a molecular scale, such as heat resistance and oxidation resistance.

The membrane disclosed in Japanese Unexamined Patent Publication (Kokai) No. 2002-525803 is a mixture of a nitrogen-containing organic polymer having anion exchange ability such as a polydiallyldimethylammonium salt and a metal hydroxide which is an inorganic matter, similar to the above-mentioned anion-exchange membranes. Japanese Unexamined Patent Publication (Kokai) No. 2004-339422 describes a solid solution which is merely made by dissolving a quaternary ammonium salt such as $(CH_3)_4NBF_4$, having anion-exchange ability, into the hybrid materials consisting of inorganic fine particles such as inorganic oxide and a polymer such as polyvinyl alcohol. In this case, like the case of a solid electrolyte made of a conventional inorganic/organic hybrid compound, the quaternary ammonium salt is not fixed, and thus a problem of leak arises. There is not any disclosure about a method of fixing the quaternary ammonium salt.

The present invention solves the above-mentioned problems of ion-conducting solid electrolytes and an object thereof is to provide a solid electrolyte with high ion-conductivity which is cheap and exhibits high conductivity even in an alkaline form, and also can stably keep high conductivity because of a small amount of the leak of a compound bearing conductivity even in a wet state, a method for manufacturing the same, and an electrochemical system using the solid electrolyte, such as a fuel cell.

In order to fulfill the above-mentioned object, the present invention basically provides a solid electrolyte with high ion-conductivity, comprising a hybrid compound which contains at least polyvinyl alcohol and a zirconic acid compound as constituents, and also contains a nitrogen-containing organic compound having a structure of amine, quaternary ammonium compound and/or imine; a solid electrolyte with high ion-conductivity, comprising a hybrid compound which contains at least polyvinyl alcohol and a zirconic acid compound, as constituents, and also contains a nitrogen-containing organic compound having a structure of amine, quaternary ammonium compound and/or imine, obtained by hydrolyzing a zirconium salt or an oxyzirconium salt in a raw material solution in which a solvent including water, polyvinyl alcohol, a zirconium salt or an oxyzirconium salt and a nitrogen-containing organic compound having a structure of amine, quaternary ammonium compound and imine coexist, removing a solvent and contacting with alkali. Hydrolysis is carried out by heating at 50° C. or higher, or heating at 50° C. or higher and pH of 7 or less.

Also, the present invention provides a constitution in which the raw material solution contains a solvent including water, polyvinyl alcohol, a zirconium salt or an oxyzirconium salt, a nitrogen-containing organic compound having a structure of amine, quaternary ammonium compound and/or imine, also contains at least one kind of salt of an alkali earth metal, aluminum and a rare earth metal; and a constitution in which the alkali contains at least one kind of hydroxide or oxoacid-salt of an alkali earth metal, aluminum, silicon, boron and tungsten in the step of contacting with alkali.

Furthermore, the present invention provides a constitution in which the nitrogen-containing organic compound contains at least a polydiallyldimethylammonium salt or a hydroxide thereof, or polyallylamine; a constitution in which the nitrogen-containing organic compound contains at least an imidazole ring; a constitution in which the nitrogen-containing organic compound contains at least polyvinyl pyrrolidone; a constitution in which a weight ratio of the nitrogen-containing organic compound to the polyvinyl alcohol is 0.18 or more; and a constitution in which the hybrid compound contains at least one kind of element of alkali earth element, aluminum, silicon, boron, a rare earth element and tungsten.

As a method for manufacturing a solid electrolyte with high ion-conductivity, the present invention provides a method comprising the steps of hydrolyzing a zirconium salt or an oxyzirconium salt in a raw material solution in which a solvent including water, polyvinyl alcohol, a zirconium salt or an oxyzirconium salt and a nitrogen-containing organic compound having a structure of amine, quaternary ammonium compound and/or imine coexist to obtain a hybrid compound solution; removing the solvent from the hybrid compound solution to obtain a hybrid compound; and contacting the hybrid compound with alkali to obtain a solid electrolyte with high ion-conductivity. Also, a raw material solution in which a solvent including water, polyvinyl alcohol, a zirconium salt or an oxyzirconium salt and a nitrogen-containing organic compound having a structure of amine, quaternary ammonium compound and/or imine coexist, is heated at 50° C. or higher and pH of 7 or less thereby hydrolyzing the zirconium salt or the oxyzirconium salt in the raw material solution and causing a polycondensation reaction of a zirconic acid compound to obtain a hybrid compound solution; and the solvent is removed from the hybrid compound solution to obtain a hybrid compound; and then the hybrid compound is contacted with alkali to obtain a solid electrolyte with high ion-conductivity.

Furthermore, when polycondensation reaction of a zirconic acid compound proceeds, the a hybrid compound of polyvinyl alcohol and a zirconic acid compound is formed, and also a nitrogen-containing organic compound entangles with polyvinyl alcohol or the zirconic acid compound at a molecular level thereby being incorporated into the hybrid compound to form a hybrid compound containing the nitrogen-containing organic compound; and the raw material solution contains at least one kind of salt of an alkali earth metal, aluminum and a rare earth metal; or the alkali to be contacted with the hybrid compound contains at least one kind of hydroxide or oxoacid-salt of an alkali earth metal, aluminum, silicon, boron and tungsten.

Also, the present invention provides an electrochemical system using a solid electrolyte with high ion-conductivity and two or more electrodes partitioned by the solid electrolyte. More specifically, the present invention provides a fuel cell, a steam pump, a dehumidifier, an air conditioners, an electrochromic device, an electrolytic device, an electrolytic hydrogen-producing device, an electrolytic hydrogen peroxide-producing device, an electrolyzed water-manufacturing device, a humidity sensor, a hydrogen sensor, a primary battery, a secondary battery, an optical switch system, or a battery system using a multivalent metal.

According to the present invention, when a hybrid compound comprising at least polyvinyl alcohol and a zirconic acid compound contains a nitrogen-containing organic compound having a structure of amine, quaternary ammonium compound and/or imine, hydroxide ion or proton conductivity can be imparted. That is, when amine, a derivative of ammonia, is used as the nitrogen-containing organic compound, it forms a coordinate bond with protons of water molecules to form cations and to generate dissociated hydroxide ions as counter ions, imparting hydroxide ion conductivity. When water molecules coexist in the vicinity, conduction of hydroxide ions can also be taken place by a mechanism in which hydroxide ions accept protons from adjacent water molecules. So Substantially, it can also be considered as proton conduction.

Also when a quaternary ammonium hydroxide is used as the nitrogen-containing organic compound, hydroxide ion or proton conductivity is imparted by the same mechanism. Imine also has hydroxide ion or proton conductivity by the same mechanism. When these nitrogen-containing organic compounds are polymers, and once they are incorporated into a hybrid compound containing polyvinyl alcohol and a zirconic acid compound as constituents, they scarcely leak because of entanglement with the hybrid compound. Even in case of a lower molecular compound, if they have two or more nitrogen moieties in one molecule, like as imidazole, they can be fixed in the hybrid compound by bonding a part of nitrogen moieties with zirconium ions or zirconic acid ions in the hybrid compound. Therefore, unlike a conventional hybrid compound containing sodium hydroxide, sodium silicate or sodium carbonate, since cations are fixed in the hybrid compound by adding the nitrogen-containing organic compound in the present invention, leak of the compound together with water is less likely to occur.

Problems with water resistance, heat resistance, oxidation resistance and alkali resistance of the membrane are relieved by introducing the nitrogen-containing organic compound into the hybrid compound containing at least polyvinyl alcohol and a zirconic acid compound in an entangled form at a molecular level, thus obtaining higher water resistance, heat resistance, oxidation resistance and alkali resistance than those of a conventional anion-exchange membrane utilizing the nitrogen-containing organic compound. As characteristics of the hybrid compound, higher shielding properties against permeation of substance than those of the anion-exchange membrane are obtained.

The nitrogen-containing organic compound can be introduced into the hybrid compound very simply only by dissolving the nitrogen-containing organic compound in a raw material solution of a hybrid compound, resulting in low cost similar to a conventional hybrid compound. That is, the nitrogen-containing organic compound generally has high solubility in water and it can realize a state of mixing with the raw materials of the hybrid compound, such as polyvinyl alcohol and a zirconium salt or an oxyzirconium salt at a molecular level only by adding into a raw material solution containing water. When a reaction forming a hybrid compound is carried out in this state, the nitrogen-containing organic compound is automatically entangled with the hybrid compound at a molecular level.

The solid electrolyte according to the present invention has hydroxide ion or proton conductivity and can be used in fuel cells, steam pumps, dehumidifiers, air conditioners, electrochromic devices, electrolytic devices, electrolytic hydrogen-producing devices, electrolytic hydrogen peroxide-producing devices, electrolyzed water-manufacturing devices, humidity sensors, hydrogen sensors, primary batteries, secondary batteries, optical switch systems, and battery systems using a multivalent metal. Furthermore, since the solid electrolyte according to the present invention is an alkaline form and is capable of improving corrosiveness to metal, unlike a conventional acid type solid electrolyte such as Nafion (tradename), it is not always necessary to use expensive corrosion-resistant materials such as noble metals in peripheral members such as electrodes. It can also be used in applications where an electrode active material cannot stably exist or function under an acidic condition, for example, primary batteries, secondary batteries, optical switch systems, or battery systems using a multivalent metal.

BRIEF DESCRIPTION OF THE DRAWINGS

FIG. 2 is a system diagram schematically showing manufacturing steps of the solid electrolyte with high ion-conductivity according to the present invention.

DETAILED DESCRIPTION OF THE INVENTION

Figure 1:
FIG. 1 shows (A) a structural drawing of amine, (B) a structural drawing of quaternary ammonium compound and (C) a structural drawing of imine of a nitrogen-containing organic compound according to the present invention.
Figure 1:
Figure 1:
Figure 1:
Figure 1:

The best mode for carrying out a solid electrolyte with high ion-conductivity and a method for manufacturing the same, and an electrochemical system using the solid electrolyte according to the present invention will be described in detail below. The present invention basically relates to a solid electrolyte with high ion-conductivity, comprising a hybrid compound which contains at least polyvinyl alcohol and a zirconic acid compound as constituents, and also which contains a nitrogen-containing organic compound having a structure of amine, quaternary ammonium compound and/or imine.

In the present invention, the hybrid compound in the solid electrolyte contains a zirconic acid compound as an indispensable constituent. Zirconic acid means a compound having $ZrO_2$ as the basic unit, which includes $H_2O$, and is represented by the general formula $ZrO_2 \cdot xH_2O$. Zirconic acid compound in the present invention means the entirety of zirconic acid and derivatives thereof, as well as compounds having zirconic acid as the main constituent. As long as the properties of zirconic acid are not impaired, other elements may be substituted in a part, and shift from the stoichiometric composition and the addition of additives is allowed. For example, zirconates and zirconium hydroxides also have the basic unit $ZrO_2$, and derivatives based on these or compounds having these as the main constituent are also included in the zirconic acid compound.

In the present invention, the hybrid compound contained in the solid electrolyte contains polyvinyl alcohol as a indispensable constituent. Also, it is not necessary for the above-mentioned polyvinyl alcohol to be perfect polyvinyl alcohol and it can be used as long as it substantially functions as polyvinyl alcohol. For example, even polyvinyl alcohol where a part of the hydroxyl groups is replaced by another group or polyvinyl alcohol where other polymers are copolymerized with a part thereof can function as the polyvinyl alcohol. Also, polyvinyl acetate, which is a raw material of polyvinyl alcohol, can be used as a starting material since a similar effect can be achieved if polyvinyl alcohol is generated in the reaction process of the present invention.

Within the scope in which the polyvinyl alcohol function in the present invention is sufficiently obtained, other polymers, for example, polyolefin polymers such as polyethylene and polypropylene, polyacrylic polymers, polyether polymers such as polyethylene oxide, and polypropylene oxide, polyester polymers such as polyethylene terephthalate and polybutylene terephthalate, fluorine polymers such as polytetrafluoroethylene and polyvinylidene fluoride, glycopolymers such as methyl cellulose, polyvinyl acetate polymers, polystyrene polymers, polycarbonate polymers, epoxy resin polymers or other organic and inorganic additives may be mixed.

In the present invention, polyvinyl alcohol and a zirconic acid compound form a hybrid compound. That is, in the hybrid compound, polyvinyl alcohol and the zirconic acid compound are entangled with each other at a molecular level and the both are strongly combined by a hydrogen bond and dehydration condensation via a hydroxyl group of polyvinyl alcohol. The hybrid compound is a compound and is distinguished from a mixture of polyvinyl alcohol and a zirconic acid compound obtained by mixing physically. Unlike the mixture, chemical properties of the respective constituents are not always kept after hybridization in the hybrid compound. For example, In the case of the present invention, polyvinyl alcohol as a constituent of the hybrid compound is soluble in water (soluble in hot water) if it is by itself, but is basically insoluble in hot water after formation of the hybrid compound with the zirconic acid compound. When the amount of zirconic acid to polyvinyl alcohol is too small in the hybrid compound, sufficient water resistance, heat resistance, oxidation resistance, alkali resistance or strength cannot be obtained. When the amount of zirconic acid is too large, flexibility is impaired to cause a problem of brittleness. It is preferred to control a ratio of the weight of the zirconic acid compound to that of polyvinyl alcohol in the hybrid compound within a range from 0.01 to 1.

In the present invention, the hybrid compound containing at least polyvinyl alcohol and a zirconic acid compound as constituents is allowed to contain a nitrogen-containing organic compound having a structure of amine, quaternary ammonium compound and/or imine. The nitrogen-containing organic compound having a structure of amine, quaternary ammonium compound and/or imine means an organic compound having nitrogen-containing moieties as shown in FIGS. 1(A), (B) and (C). Amine is a derivative of ammonia and is generally classified into a primary amine, a secondary amine and a tertiary amine according to the structure as shown in FIG. 1(A). These amines have the same function in the respect that they form coordination bond with protons of water molecules and generate dissociated hydroxide ions, and also have hydroxide ion conductivity. In order to more stably fix the nitrogen-containing organic compound in the hybrid compound, the nitrogen-containing organic compound is preferably a polymer, and polymers having an amino group, such as polyallylamine; polymers having a quaternary ammonium group, such as a polydiallyldimethylammonium salt and a polyvinylbenzyltrimethylammonium salt; polymers having a pyridine ring, such as polyvinylpyridine and polyvinylmethylpyridine; polymers having an imidazole ring, such as polyvinylimidazole and polybenzoimidazole; and polyvinyl pyrrolidone can be used. Among these polymers, a polydiallyldimethylammonium salt and polyallylamine are preferably used in view of ion conductivity. Polyvinyl pyrrolidone is preferably used so as to suppress swelling due to water absorption of the solid electrolyte.

Even in case of a low molecular nitrogen-containing organic compound, those having two or more nitrogen moieties in one molecule can be used because of good fixing properties. In the case of having two or more nitrogen moieties, it becomes possible to bond with zirconic acid ions at one nitrogen moiety and to bear hydroxide ion conduction at the other nitrogen moiety. Imidazole is an example of that compound.

The content of the nitrogen-containing organic compound is preferably 0.18 or more in terms of a weight ratio to polyvinyl alcohol. When the content is less than the above range, high ion conductivity cannot be obtained. However, when the content of the nitrogen-containing organic compound is too large, there arise problems that the strength decreases and oxidation resistance deteriorates, and also water absorptivity of the entire solid electrolyte increases, resulting in excessive swell. Therefore, the content is preferably 2 or less in a weight ratio to polyvinyl alcohol.

The hybrid compound, which contains at least polyvinyl alcohol and a zirconic acid compound as constituents, and also contains a nitrogen-containing organic compound having a structure of amine, quaternary ammonium compound and/or imine, can be prepared through the steps of heating the raw material solution in which a solvent including water, polyvinyl alcohol, a zirconium salt or an oxyzirconium salt and a nitrogen-containing organic compound coexists, at 50° C. or higher and pH of 7 or less thereby hydrolyzing the zirconium salt or the oxyzirconium salt; removing the solvent; and contacting with alkali.

FIG. 2 is a system diagram schematically showing the manufacturing steps of the solid electrolyte with high ion-conductivity according to the present invention. Firstly, as raw materials, a solvent including water is prepared in step 1, polyvinyl alcohol is prepared in step 2, a zirconium salt or an oxyzirconium salt is prepared is step 3, and a nitrogen-containing organic compound is prepared in step 4. These raw materials are mixed in step 5 and a raw material solution is obtained where the polyvinyl alcohol, the zirconium salt or the oxyzirconium salt and a nitrogen-containing organic compound coexist in the solvent including water. In order to efficiently carry out membrane making of the solid electrolyte by removing water in the raw material solution within the actual time range of production, it is preferable that the concentration of the polyvinyl alcohol in the raw material solution is 5% by weight or more, and more preferably 10% by weight or more. Any type of zirconium salt or oxyzirconium salt may be used as long as it dissolves in the solvent including water. Any values can be used for the oxygen and the anion proportions, and the water content.

Also, since the reaction of the present invention proceeds in a solvent including water, there is no need for the solvent to be only pure water as long as it includes water. However, considering the solubility of the zirconium salt or the oxyzirconium salt, or the solubility of the polyvinyl alcohol, water is the most preferable solvent. Thus, the solvent including water as a constituent element of the present invention shown in step 1 may be any solvent as long as it includes water and can coexist with water. In more detail, since the reaction of the present invention occurs even with the other solvents coexisting as long as there is the minimum amount of water used for the reaction, and there are many solvents that can coexist with water, these solvents may be present with water as the solvent of the present invention. In other words, the solvent means all of the components in the raw material solution other than the polyvinyl alcohol, and the zirconium salt and the nitrogen-containing organic compound, which are solutes. For example, sugar will become member of the solvent if it is dissolved, that is, all of the substances deemed to be liquids (includes dissolved solids) that can substantially coexist with water can become the solvent.

Next, in step 6, the raw material solution is heated at 50° C. or higher with maintaining the pH at 7 or less. By doing so, as shown in step 7, the zirconium salt or the oxyzirconium salt is hydrolyzed and condensation polymerization of the zirconic acid compound simultaneously occurs. At the condensation polymerization reaction of this zirconic acid, entanglement of the polyvinyl alcohol molecules coexistent in the raw material solution and the zirconic acid compound molecules occurs at a molecular level, and both bond by hydrogen bonding or dehydration condensation via a hydroxyl group to form the solution of the hybrid compound shown in step 8. At this step, the nitrogen-containing organic compound dissolved in the raw material solution also causes entanglement with polyvinyl alcohol or a zirconic acid compound at a molecular level and thus automatically incorporated into the hybrid compound. When the pH of the raw material solution is beyond 7, hydrolysis of the zirconium salt and the following condensation reaction of the zirconic acid rapidly proceed, and when the concentration of the polyvinyl alcohol is high, gelation proceeds. Thus, the pH of the raw material solution is preferably controlled to 7 or less, and more preferably to 2 or less.

When the heating temperature is lower than 50° C., it is difficult for sufficient hydrolysis of the zirconium salt to occur in the actual time range of production. In contrast, when the heating temperature is an extremely high, there is a problem that gelation begins since hydrolysis of the zirconium salt and the condensation reaction of the following zirconic acid proceeds excessively. In such a situation, however, there are no particular limitations to the maximum temperature since it is possible to control by adjusting the heating time. Nevertheless, from the perspective of the necessity of keeping the temperature of the raw material solution homogeneous at increasing and decreasing the temperature, a temperature range up to about 80° C. is preferable from a practical point of view.

Although the heating time may be adjusted according to the selected heating temperature, a range from 20 minutes to 5 hours is appropriate at 50° C. If less than this, the progress of the hydrolysis of the zirconium salt is not sufficient and if longer than this, there is a possibility that gelation begins. Also, a range from several minutes to about 30 minutes is preferable at 80° C.

In step 9, when the solvent is removed from the hybrid compound solution obtained in step 8, a hybrid compound A, which becomes the solid electrolyte shown in step 10 is formed. With respect to the hybrid compound A, the hydrolysis of the zirconium salt or the oxyzirconium salt, or the dehydration condensation of the zirconic acid compound proceeds not necessarily perfectly. If a solid electrolyte is made by membrane formation without contacting the complex compound A with alkali, only an imperfect solid electrolyte is obtained and holes generate on it when it is immersed in water. Thus, the hybrid compound A of step 10 obtained by solidification in step 9 by removing the solvent from the hybrid compound solution made in step 8 is needed to contact with alkali in step 11.

The alkali which contacts the complex compound A may be any alkali as long as it can neutralizes the zirconium salt or the oxyzirconium salt. It is possible to use ammonia, sodium hydroxide, potassium hydroxide, lithium hydroxide, calcium hydroxide, strontium hydroxide, barium hydroxide, and carbonates. These may be used alone or multiple alkalis may be mixed and used. Also, as a method for contacting the formed hybrid compound A with the alkali, there are methods such as immersing in an alkaline solution, smearing or spraying the complex compound with an alkaline solution, and exposing to an alkaline vapor.

By contacting with alkali in these ways, hydrolysis and dehydration condensation of the hybrid compound A is further promoted in step 12 and a stable hybrid compound B in an alkaline form (=solid electrolyte with high ion-conductive according to the present invention) is obtained in step 13. When contacting with alkali, the problem of gelation does not occur since the complex compound B has already been formed as a solid.

In the present invention, at least one kind of element of an alkali earth element, aluminum, silicon, boron, a rare earth element and tungsten can be introduced into a hybrid compound which contains at least polyvinyl alcohol and a zirconic acid compound as constituents, and also contains a nitrogen-containing organic compound having a structure of amine, quaternary ammonium compound and/or imine. Among these element, an alkali earth metal element, aluminum and a rare earth element can be introduced by allowing a solution, in which a solvent including water, polyvinyl alcohol, a zirconium salt or an oxyzirconium salt, and a nitrogen-containing organic compound having a structure of amine, quaternary ammonium compound and/or imine coexist, to contain at least one kind of salt of an alkali earth metal, aluminum and a rare earth metal in the above-mentioned manufacturing method. In that case, the salt of the alkali earth metal, aluminum and rare earth metal is not specifically limited as long as it is finally neutralized by contacting with alkali and is introduced into the hybrid compound as an oxide or a hydroxide. For example, calcium chloride, strontium chloride, aluminum chloride, lanthanum chloride, yttrium chloride, and a hydrate thereof may be preferably used as raw materials.

An alkali earth metal element, aluminum, silicon, boron, and tungsten can also be introduced into the hybrid compound by allowing to contain at least one kind of hydroxide or an oxoacid-salt of an alkali earth metal, aluminum, silicon, boron and tungsten in alkali in the step of contacting with alkali of the above-mentioned manufacturing method. As raw materials, for example, calcium hydroxide, strontium hydroxide, aluminum hydroxide, sodium aluminate, sodium silicate, sodium borate, sodium tungstate, or a hydrate thereof can be used.

The solid electrolyte with high ion-conductivity obtained by the present invention exhibits high proton or hydroxide ion conductivity in an alkaline form. The alkaline form enables employment of comparatively cheap materials such as nickel as system constituent materials of electrodes or others, and enables cost reduction of the entire systems.

Furthermore, the alkaline form enables application to primary batteries and secondary batteries, by substituting an electrolyte material of the present invention for alkaline electrolyte solution, leakage of the electrolyte solution can be avoided. For example, a secondary battery with high energy density using a divalent or higher multivalent metal as a negative electrode has hitherto been difficult to put into practical use, however it can be realized by employing the alkaline form solid electrolyte. A nickel-zinc battery using zinc oxide as a negative electrode and using the same nickel hydroxide as that in nickel hydride batteries as a positive electrode can be listed as an example. As shown in the following formulae (12) and (13), in the nickel-zinc battery, zinc oxide is reduced to metallic zinc upon charging in the negative electrode, while zinc is electrochemically oxidized thereby returning to zinc oxide upon discharging.

$$\text{(Charging) } ZnO+H_2O+2e^- \rightarrow Zn+2OH^- \tag{12}$$

$$\text{(Discharging) } Zn+2OH^- \rightarrow ZnO+H_2O+2e^- \tag{13}$$

A nickel-zinc battery has high energy storage density because zinc has two valences, but has a problem that zinc oxide is easily dissolved in an alkali electrolytic solution and zinc ions are eluted from the electrode or needle-like metallic zinc (dendrite) is produced when the eluted zinc ions are reduced upon charging, and thus the needle-like metallic zinc penetrates a separator to cause short circuit. There is also a problem that zinc is oxidized by water during leaving after charging to cause self-discharging, and that hydrogen is generated from a zinc electrode upon charging thereby decreasing charging efficiency, since zinc has a lower redox potential than that of hydrogen. Although these things reveal that a battery using a liquid electrolyte is difficult to put into practical use, when the solid electrolyte with high ion-conductivity according to the present invention is used, a dendrite of metal is scarcely produced since dissolution of metal ions is suppressed and metal ions are slowly diffused from the electrode even when dissolved slightly. Even when the dendrite is produced, the solid electrolyte itself prevents the dendrite piercing from a negative electrode to a positive electrode. Furthermore, water in the solid electrolyte has low reactivity and is less likely to cause a problem with self-discharging even for the case using metal having a lower redox potential than that of hydrogen, and is also less likely to cause electrolysis of water, that is, a reductive reaction of protons, which competes with a reductive reaction of metal, and thus charging efficiency is also improved. The effect of suppressing dissolution and diffusion of the above-mentioned metal ions and the effect of preventing production of a dendrite can also exert the similar operation and effect on primary batteries or nickel hydride batteries. Furthermore, the same merit described above is given to zinc air batteries using an air electrode as a positive electrode, and since diffusion of oxygen to a zinc electrode is suppressed, a chargeable battery can be easily obtained.

Since a lot of divalent or higher multivalent metals such as copper, cobalt, iron, manganese, chromium, vanadium, tin, molybdenum, niobium, tungsten, silicon, boron and aluminum exist, in addition to zinc, the secondary batteries using these metals can be realized by employment of the electrolyte according to the present invention.

In alkaline secondary batteries such as nickel hydride batteries, an alkaline electrolyte solution impregnated in a porous separator is conventionally used. Since the electrolyte according to the present invention has both functions of an electrolyte solution and a separator, the electrolyte solution becomes unnecessary or its amount can be decreased and thus energy density of the battery can be improved. Since short circuit can be prevented even for a thin membrane, unlike a porous separator, a thin electrode with a large surface area can be used.

Since the solid electrolyte according to the present invention is in an alkaline form, it becomes possible to use an organic compound liquid fuel having a C—C bond such as ethanol or ethylene glycol when applied to a fuel cell. In the case of using a conventional acid type electrolyte, high catalytic activity to an oxidative decomposition reaction of an organic compound having a C—C bond cannot be obtained, and therefore methanol having no C—C bond was usually used as the liquid fuel but has a problem such as toxicity. However, in the case of the alkaline form electrolyte, since high catalytic activity to an oxidative decomposition reaction of an organic compound having a C—C bond can be obtained, it becomes possible to use a liquid fuel, such as ethanol or ethylene glycol, which is safe and is easy to handle.

The solid electrolyte according to the present invention is by far cheaper than a conventional perfluorosulfonic acid electrolyte because it is made from a cheap raw material and is manufactured based on a simple aqueous solution process. Furthermore, it is easy to form into a thin membrane because it is flexible unlike an inorganic solid material. When hybridization of polyethylene oxide and a silicon compound, which has conventionally been made a trial, is selected, a hybrid compound having hot water resistance cannot be manufactured even when the present invention is applied and it is necessary to use a high-cost method like a sol-gel method. However, it is possible to employ an aqueous solution method, which provides easy manufacture and low-cost, by selecting polyvinyl alcohol like the present invention.

As disclosed above, the solid electrolyte with high ion-conductivity according to the present invention is proton conductive or hydroxide conductive. So, like as the case of conventional perfluorosulfonic acid ion-exchange membranes, it can be used in fuel cells, steam pumps, dehumidifiers, air conditioners, electrochromic devices, electrolytic devices, electrolytic hydrogen-producing devices, electrolytic hydrogen peroxide-producing apparatus, electrolyzed water-producing devices, humidity sensors, and hydrogen sensors. Since this solid electrolyte material shows high ion conductivity even in an alkaline form, it can be applied to primary batteries, secondary batteries, optical switch systems, and new battery systems using a multivalent metal.

Specific examples of a solid electrolyte with high ion-conductivity and a method for manufacturing the same, and an electrochemical system using the solid electrolyte according to the present invention will be described below. The present invention is not limited to descriptions in these examples.

EXAMPLE 1

To manufacture the solid electrolyte with high ion-conductivity according to the present invention, firstly, 50 cc of a 7 wt % aqueous solution of polyvinyl alcohol having a polymerization degree of 3,100 to 3,900 and a saponification degree of 86 to 90% was mixed with a 20 wt % aqueous solution of polydiallyldimethylammonium chloride having a molecular weight of 100,000 to 200,000 as a nitrogen-containing organic compound so as to adjust a weight ratio of polydiallyldimethylammonium chloride to polyvinyl alcohol to 0.06, and mixed with 12 g of a 16.7 wt % aqueous solution of zirconium oxychloride octahydrates ($ZrCl_2O \cdot 8H_2O$), followed by heating with stirring at 50° C. for one hour to obtain a raw material solution. The raw material solution was degassed and then cast over a polyester film put on a flat and smooth pedestal of a coating device (K Control Coater 202 manufactured by P K Print Coat Instruments Ltd.) equipped with a blade that allowed adjustment of the gap with the pedestal using a micrometer. At this time, the pedestal was controlled at a temperature of 50 to 60° C. by heating. Immediately after casting the hybrid compound solution over the pedestal, the blade with the gap adjusted to 0.6 mm was swept over the hybrid compound solution with a constant speed to make it into a constant thickness. The hybrid compound solution was kept heating at 50 to 60° C. and removing water, and after its fluidity was nearly lost, the same hybrid compound solution was cast again over it and immediately the blade with the gap adjusted to 0.6 mm was swept again over the hybrid compound solution to make it a constant thickness. The temperature of pedestal was raised to 140 to 150° C. and heating was continued for one and a half hours with keeping this state. Subsequently, the membrane formed on the pedestal was peeled off, and after immersing in a 1.67 wt % ammonia aqueous solution for 2 hours at room temperature, washed with hot water at 60 to 70° C. for 30 minutes and then heated at 120° C. for one hour.

EXAMPLE 2

An electrolyte membrane was manufactured through the same steps as in Example 1, except that the polydiallyldimethylammonium chloride as the nitrogen-containing organic compound in Example 1 was used in the amount in terms of a weight ratio to polyvinyl alcohol of 0.12.

EXAMPLE 3

An electrolyte membrane was manufactured through the same steps as in Example 1, except that the polydiallyldimethylammonium chloride as the nitrogen-containing organic compound in Example 1 was used in the amount in terms of a weight ratio to polyvinyl alcohol of 0.18.

EXAMPLE 4

An electrolyte membrane was manufactured through the same steps as in Example 1, except that the polydiallyldimethylammonium chloride as the nitrogen-containing organic compound in Example 1 was used in the amount in terms of a weight ratio to polyvinyl alcohol of 0.24.

EXAMPLE 5

An electrolyte membrane was manufactured through the same steps as in Example 1, except that the polydiallyldimethylammonium chloride as the nitrogen-containing organic compound in Example 1 was used in the amount in terms of a weight ratio to polyvinyl alcohol of 0.32.

EXAMPLE 6

An electrolyte membrane was manufactured through the same steps as in Example 1, except that the polydiallyldimethylammonium chloride as the nitrogen-containing organic compound in Example 1 was used in the amount in terms of a weight ratio to polyvinyl alcohol of 0.44.

EXAMPLE 7

An electrolyte membrane was manufactured through the same steps as in Example 1, except that a 20 wt % aqueous solution of a polyallylamine hydrochloride was used in place of the 20 wt % aqueous solution of the polydiallyldimethylammonium chloride as the nitrogen-containing organic compound in Example 1 in the amount in terms of a weight ratio of polyallylamine hydrochloride to polyvinyl alcohol of 0.06.

EXAMPLE 8

An electrolyte membrane was manufactured through the same steps as in Example 7, except that polyallylamine hydrochloride as the nitrogen-containing organic compound in Example 7 was used in the amount in terms of a weight ratio to polyvinyl alcohol of 0.18.

EXAMPLE 9

An electrolyte membrane was manufactured through the same steps as in Example 1, except that a 10 wt % aqueous solution of an imidazole hydrochloride was used in place of the 20 wt % aqueous solution of polydiallyldimethylammonium chloride as the nitrogen-containing organic compound in Example 1 in the amount in terms of a weight ratio of the imidazole hydrochloride to polyvinyl alcohol of 0.06.

EXAMPLE 10

An electrolyte membrane was manufactured through the same steps as in Example 9, except that the imidazole hydrochloride as the nitrogen-containing organic compound in Example 9 was used in the amount in terms of a weight ratio to polyvinyl alcohol of 0.20.

EXAMPLE 11

An electrolyte membrane was manufactured through the same steps as in Example 1, except that a 10 wt % aqueous solution of polyvinyl pyrrolidone was used in place of the 20 wt % aqueous solution of polydiallyldimethylammonium chloride as the nitrogen-containing organic compound in Example 1 in the amount in terms of a weight ratio of polyvinyl pyrrolidone to polyvinyl alcohol of 0.29.

COMPARATIVE EXAMPLE

An electrolyte membrane was manufactured through the same steps as in Example 1, except that the 20 wt % aqueous solution of polydiallyldimethylammonium chloride as the nitrogen-containing organic compound in Example 1 was not added. Ion conductivity of the electrolyte membranes of Example 1 to Example 11 and Comparative Example was measured. The results are shown in Table 1.

TABLE 1

Ion conductivity of zirconic acid compound/polyvinyl alcohol hybrid compound containing a nitrogen-containing organic compound having a structure of amine, quaternary ammonium compound and/or imine

| No. | Kind of nitrogen-containing organic compound | Content of nitrogen-containing organic compound [weight ratio to polyvinyl alcohol] | Ion conductivity $(Scm^{-1})$ |
|---|---|---|---|
| Example 1 | Polydiallyldimethylammonium chloride | 0.06 | $1.1 \times 10^{-5}$ |

TABLE 1-continued

Ion conductivity of zirconic acid compound/polyvinyl alcohol
hybrid compound containing a nitrogen-containing organic
compound having a structure of amine, quaternary ammonium
compound and/or imine

| No. | Kind of nitrogen-containing organic compound | Content of nitrogen-containing organic compound [weight ratio to polyvinyl alcohol] | Ion conductivity ($Scm^{-1}$) |
|---|---|---|---|
| Example 2 | Polydiallyldimethylammonium chloride | 0.12 | $5.4 \times 10^{-5}$ |
| Example 3 | Polydiallyldimethylammonium chloride | 0.18 | $2.7 \times 10^{-4}$ |
| Example 4 | Polydiallyldimethylammonium chloride | 0.24 | $2.1 \times 10^{-3}$ |
| Example 5 | Polydiallyldimethylammonium chloride | 0.32 | $2.2 \times 10^{-3}$ |
| Example 6 | Polydiallyldimethylammonium chloride | 0.44 | $2.6 \times 10^{-3}$ |
| Example 7 | Polyallylamine hydrochloride | 0.06 | $2.5 \times 10^{-5}$ |
| Example 8 | Polyallylamine hydrochloride | 0.18 | $8.8 \times 10^{-4}$ |
| Example 9 | Imidazole hydrochloride | 0.06 | $8.4 \times 10^{-5}$ |
| Example 10 | Imidazole hydrochloride | 0.20 | $6.5 \times 10^{-4}$ |
| Example 11 | Polyvinyl pyrrolidone | 0.29 | $2.1 \times 10^{-4}$ |
| Comparative Examples | None | 0 | $1.0 \times 10^{-4}$ |

Ion conductivity of the solid electrolyte thus manufactured was measured by the following procedure. First, each solid electrolyte is cut into a circle having a diameter of 30 mm, interposed between two platinum disks having a diameter of 28 mm and a nickel disk disposed outside the platinum disk, and then fixed using an insulated clip. Using an LCR meter, AC voltage of 10 mV was applied to a lead wire attached to the nickel disk with varying a frequency from 5 MHz to 50 Hz, and then a current and response of a phase angle were measured. Ion conductivity was determined from Cole-Cole plots using a conventional method. This measurement was carried out in a state where the solid electrolyte is immersed in pure water with controlling the temperature to 60° C. in an incubator. The measurement was carried out, 30 minutes after immersion in pure water.

As shown in Table 1, in all solid electrolytes of Example to Example 11, ion conductivity remarkably increased and showed a high value of $10^{-5}$ to $10^{-3}$ S/cm by including a nitrogen-containing organic compound having a structure of amine, quaternary ammonium compound and/or imine. These solid electrolytes are through the wash process of hot water for 30 minutes after treating with alkali. Also, these solid electrolytes are immersed in pure water at 60° C. for about 30 minutes upon measurement. However, high conductivity is kept. This fact shows that the basic nitrogen-containing organic compound is fixed in a hybrid compound constituting the solid electrolyte without causing leak.

EXAMPLE 12

Next, 50 cc of a 7 wt % aqueous solution of polyvinyl alcohol having a polymerization degree of 3,100 to 3,900 and a saponification degree of 86 to 90% was mixed with a 20 wt % aqueous solution of polydiallyldimethylammonium chloride having a molecular weight of 100,000 to 200,000 as a nitrogen-containing organic compound in the amount in terms of a weight ratio of polydiallyldimethylammonium chloride to polyvinyl alcohol of 0.32, mixed with a 10 wt % aqueous solution of polyvinyl pyrrolidone having an average molecular weight of 35,000 in terms of a weight ratio of polyvinyl pyrrolidone to polyvinyl alcohol of 0.09, and mixed with 12 g of a 16.7 wt % aqueous solution of zirconium oxychloride octahydrate ($ZrCl_2O \cdot 8H_2O$), followed by heating with stirring at 50° C. for one hour to obtain a raw material solution. An electrolyte membrane was manufactured through the same steps in Example 1 using the resultant raw material solution.

Ion conductivity of the electrolyte membrane of Example 12 and a swelling ratio of the electrolyte membranes of Examples 5, 11 and 12 were measured. The results are shown in Table 2. The swelling ratio was determined by the following procedure. That is, a diameter of a membrane was measured immediately after immersion in pure water at room temperature for 30 minutes, and after drying at 80° C., and then a swelling ratio due to water absorption was determined from an increase in a membrane area.

TABLE 2

Effect on suppression of swelling when polyvinyl pyrrolidone
is used in combination with other nitrogen-containing compounds

| | Content of polydiallyldimethylammonium chloride (weight ratio to polyvinyl alcohol) | Content of polyvinyl pyrrolidone (weight ratio to polyvinyl alcohol) | Swelling ratio (%) | Ion conductivity ($Scm^{-1}$) |
|---|---|---|---|---|
| Example 12 | 0.32 | 0.09 | 33 | $3.1 \times 10^{-3}$ |
| Example 5 | 0.32 | 0 | 59 | $2.2 \times 10^{-3}$ |
| Example 11 | 0 | 0.29 | 4 | $2.1 \times 10^{-4}$ |

As shown in Table 2, the membrane area of the electrolyte membrane, which contains polydiallyldimethylammonium chloride but does not contain polyvinyl pyrrolidone, of Example 5 expanded by 59%; the membrane area of the electrolyte membrane, which contains polyvinyl pyrrolidone but does not contain polydiallyldimethylammonium chloride, of Example 11 expanded by 4%, and the membrane area of the electrolyte membrane, which contains both polydiallyldimethylammonium chloride and polyvinyl pyrrolidone, of Example 12 expanded by 33%, and thus it is found that swelling is remarkably reduced by the addition of polyvinyl pyrrolidone. This effect of remarkable reduction in swelling means that the addition of polyvinyl pyrrolidone has effect on relieving problems such as variation of the size and decrease in strength in the application such as fuel cells in which electrolyte are used in a wet state. Although polyvinyl pyrrolidone does not exerts a great effect of improving ion conductivity, it becomes possible to suppress the swelling ratio to a level, which does not cause a practical problem, with realizing high ion conductivity by introducing together with other nitrogen-containing organic compounds having high effect of improving ion conductivity, like Example 12.

EXAMPLE 13

50 cc of a 7 wt % aqueous solution of polyvinyl alcohol having a polymerization degree of 3,100 to 3,900 and a saponification degree of 86 to 90% was mixed with a 20 wt % aqueous solution of polydiallyldimethylammonium chloride having a molecular weight of 100,000 to 200,000 as a nitrogen-containing organic compound in the amount in terms of a weight ratio of polydiallyldimethylammonium chloride to polyvinyl alcohol of 0.32, mixed with 12 g of an aqueous 16.7 wt % solution of zirconium oxychloride octahydrate ($ZrCl_2O \cdot 8H_2O$), and mixed with a predetermined amount of a 20 wt % aqueous solution of lanthanum chloride heptahydrate, followed by heating at 50° C. with stirring for one hour to obtain a raw material solution. An electrolyte membrane was manufactured through the same steps in Example 1 using the resultant raw material solution.

EXAMPLE 14

An electrolyte membrane was manufactured through the same steps as in Example 13, except that calcium chloride hexahydrate was used in place of lanthanum chloride heptahydrate in Example 13.

EXAMPLE 15

An electrolyte membrane was manufactured through the same steps as in Example 13, except that strontium chloride hexahydrate was used in place of lanthanum chloride heptahydrate in Example 13.

EXAMPLE 16

An electrolyte membrane was manufactured through the same steps as in Example 13, except that aluminum chloride hexahydrate was used in place of lanthanum chloride heptahydrate in Example 13.

EXAMPLE 17

An electrolyte membrane was manufactured through the same steps as in Example 13, except that yttrium chloride hexahydrate was used in place of lanthanum chloride heptahydrate in Example 13.

For the electrolyte membranes of Examples 13 to 17 and Example 5, ion conductivity was measured after 30 minutes immersion in pure water. The results are shown in Table 3. All of the electrolyte membranes containing an alkali earth metal element, aluminum and a rare earth metal element added therein of Examples showed higher conductivity than that of the electrolyte membrane containing no dissimilar element added therein of Example 5.

TABLE 3

Ion conductivity when elements other than zirconium are added to zirconic acid compound/polyvinyl alcohol hybrid compound containing nitrogen-containing organic compound

|  | Dissimilar additive element | Additive amount (weight ratio to polyvinyl alcohol) | Ion conductivity ($Scm^{-1}$) |
|---|---|---|---|
| Example 13 | Lanthanum | 0.025 | $4.1 \times 10^{-3}$ |
| Example 14 | Calcium | 0.022 | $2.7 \times 10^{-3}$ |
| Example 15 | Strontium | 0.022 | $2.9 \times 10^{-3}$ |
| Example 16 | Aluminum | 0.034 | $5.4 \times 10^{-3}$ |
| Example 17 | Yttrium | 0.021 | $3.6 \times 10^{-3}$ |
| Example 5 | None | 0 | $2.2 \times 10^{-3}$ |

EXAMPLE 18

50 cc of a 7 wt % aqueous solution of polyvinyl alcohol having a polymerization degree of 3,100 to 3,900 and a saponification degree of 86 to 90% was mixed with a 20 wt % aqueous solution of polydiallyldimethylammonium chloride having a molecular weight of 100,000 to 200,000 as a nitrogen-containing organic compound in the amount in terms of a weight ratio of polydiallyldimethylammonium chloride to polyvinyl alcohol of 0.32, and mixed with 12 g of a 16.7 wt % aqueous solution of zirconium oxychloride octahydrate ($ZrCl_2O \cdot 8H_2O$), followed by heating with stirring at 50° C. for one hour to obtain a raw material solution. An electrolyte membrane was manufactured through the same steps in Example 1 using the resultant raw material solution.

EXAMPLE 18-1

The electrolyte membrane was alkali-treated by immersion in a solution prepared by adding 2.5 g of calcium hydroxide and 4 g of sodium hydroxide in 100 cc of water.

EXAMPLE 18-2

The electrolyte membrane was alkali-treated by immersion in a solution prepared by adding 2.5 g of aluminum hydroxide and 4 g of sodium hydroxide in 100 cc of water.

EXAMPLE 18-3

The electrolyte membrane was alkali-treated by immersion in a solution prepared by adding 2.5 g of sodium aluminate and 4 g of sodium hydroxide in 100 cc of water.

EXAMPLE 18-4

The electrolyte membrane was alkali-treated by immersion in a solution prepared by adding 2.5 g of sodium tetraborate decahydrate and 4 g of sodium hydroxide in 100 cc of water.

EXAMPLE 18-5

The electrolyte membrane was alkali-treated by immersion in a solution prepared by adding 9 g of 52-57 wt % sodium silicate (water-glass) and 4 g of sodium hydroxide in 100 cc of water.

EXAMPLE 18-6

The electrolyte membrane was alkali-treated by immersion in a solution prepared by adding 2.5 g of sodium tungstate dihydrate and 4 g of sodium hydroxide in 100 cc of water.

Ion conductivity of the electrolyte membranes alkali-treated with an alkali solution containing these dissimilar metal elements of Example 18-1 to Example 18-3 was measured. The results are shown in Table 4. As shown in Table 4, the electrolyte membranes alkali-treated with a solution containing aluminum and calcium elements showed higher conductivity than that of the electrolyte membrane, which is treated with only ammonia and does not contain a dissimilar metal element added therein, of Example 5.

TABLE 4

Ion conductivity of zirconic acid compound/polyvinyl alcohol hybrid compound containing nitrogen-containing organic compound when respective hydroxides and oxoacid-salts are added in alkali treating solution

|  | Additives to treating agent | Ion conductivity $(Scm^{-1})$ |
|---|---|---|
| Example 18-1 | Calcium hydroxide | $3.5 \times 10^{-3}$ |
| Example 18-2 | Aluminum hydroxide | $4.6 \times 10^{-3}$ |
| Example 18-3 | Sodium aluminate | $3.8 \times 10^{-3}$ |
| Example 5 | None | $2.2 \times 10^{-3}$ |

A swelling ratio of the electrolyte membranes alkali-treated with an alkali solution containing these dissimilar metal elements of Example 18-4 to Example 18-6 was measured. The results are shown in Table 5. As shown in Table 5, the electrolyte membrane alkali-treated with a solution containing boron, silicon and tungsten elements showed a swelling ratio of 32% to 26% which is lower than a swelling ratio of 59% of the electrolyte membrane with the same composition, which is treated with only ammonia and does not contain a dissimilar metal element added therein, of Example 5.

TABLE 5

Swelling ratio of zirconic acid compound/polyvinyl alcohol hybrid compound containing nitrogen-containing organic compound when respective hydroxides are added in alkali treating solution

|  | Additives to treating agent | Swelling ratio (%) |
|---|---|---|
| Example 18-4 | Sodium borate | 26 |
| Example 18-5 | Sodium silicate | 30 |
| Example 18-6 | Sodium tungstate | 32 |
| Example 5 | None | 59 |

As described in detail above, according to the present invention, when a hybrid compound containing at least polyvinyl alcohol and a zirconic acid compound as constituents contains a nitrogen-containing organic compound having a structure of amine, quaternary ammonium compound and/or imine, there can be provided a solid electrolyte with high ion-conductivity, which can impart high hydroxide ion or proton conductivity and is cheap and exhibits high conductivity even in an alkaline form, and also can stably keep high conductivity because of a small amount of the leak of a compound bearing conductivity even in a wet state, and a method for manufacturing the same.

The nitrogen-containing organic compound having a structure of amine, quaternary ammonium compound and/or imine can be introduced into the hybrid compound containing at least a zirconic acid compound and polyvinyl alcohol by a very simple method, and the electrolyte membrane obtained by hybridization with a zirconic acid compound at a molecular level is excellent in chemical stability and shielding properties against substance permeation as compared with an anion-exchange membrane made of a conventional nitrogen-containing organic compound. The solid electrolyte according to the present invention can be used in fuel cells, steam pumps, dehumidifiers, air conditioners, electrochromic devices, electrolytic devices, electrolytic hydrogen-producing devices, electrolytic hydrogen peroxide-producing devices, electrolyzed water-manufacturing devices, humidity sensors, hydrogen sensors, primary batteries, secondary batteries, optical switch systems, and battery systems using a multivalent metal because of its proton or hydroxide ion conductivity. Since the solid electrolyte is in an alkaline form and corrosiveness to metal can be improved, unlike a conventional acid type solid electrolyte such as Nafion (tradename), it is not always unnecessary to use expensive corrosion-resistant materials such as noble metals in peripheral members such as electrode. It can also be used in applications such as primary batteries, secondary batteries, optical switch systems, or battery systems using a multivalent metal, where an electrode active material cannot stably exist or function under an acidic conditions.

What is claimed is:

1. A solid electrolyte with high ion-conductivity, comprising a hybrid compound, the hybrid compound comprising polyvinyl alcohol and a zirconic acid compound as constituents, and a nitrogen-containing organic compound having a nitrogen-containing moiety comprising at least one member selected from the group consisting of an amine moiety, a quaternary ammonium moiety, and an imine moiety, wherein the polyvinyl alcohol and the zirconic acid compound are entangled with one another and combined by a hydrogen bond and/or dehydration condensation via a hydroxyl group of the polyvinyl alcohol, and wherein the nitrogen-containing organic compound is fixed to a zirconium ion and/or a zirconic acid ion of the zirconic acid compound.

2. A method for manufacturing a solid electrolyte with high ion-conductivity, comprising
forming a hybrid compound by hydrolyzing at least one salt selected from the group consisting of a zirconium salt and an oxyziconium salt in the presence of at least an aqueous solvent, polyvinyl alcohol, and a nitrogen-containing organic compound having a nitrogen-containing moiety comprising at least one member selected from the group consisting of an amine moiety, a quaternary ammonium moiety, and an imine moiety, removing the aqueous solvent and contacting the hybrid compound with alkali, to polymerize the at least one salt into a zirconic acid compound entangled with the polyvinyl alcohol and combined by a hydrogen bond and/or dehydration condensation via a hydroxyl group of the polyvinyl alcohol, and to fix the nitrogen-containing organic compound to a zirconium ion and/or a zirconic acid ion of the zirconic acid compound.

3. The method according to claim 2, wherein the hydrolyzing comprises heating the zirconium salt or the oxyzirconium salt in solution at 50° C. or higher.

4. The method according to claim 2, wherein the hydrolyzing comprises heating the zirconium salt or the oxyzirconium salt at 50° C. or higher in a solution having a pH of 7 or less.

5. The method according to claim 2, wherein the hydrolyzing is conducted in a solution containing at least one salt of an alkali earth metal, aluminum and a rare earth metal.

6. The method according to claim 2, wherein the alkali contains at least one hydroxide or oxoacid-salt of a member selected from the group consisting of an alkali earth metal, aluminum, silicon, boron and tungsten.

7. The solid electrolyte with high ion-conductivity according to claim 1, wherein the nitrogen-containing organic compound contains at least a polydiallyldimethylammonium salt or a hydroxide thereof, or polyallylamine.

8. The solid electrolyte with high ion-conductivity according to claim 1, wherein the nitrogen-containing organic compound contains at least an imidazole ring.

9. The solid electrolyte with high ion-conductivity according to claim 1, wherein the nitrogen-containing organic compound contains at least polyvinyl pyrrolidone.

10. The solid electrolyte with high ion-conductivity according to claim 1, wherein a weight ratio of the nitrogen-containing organic compound to the polyvinyl alcohol is 0.18 or more.

11. The solid electrolyte with high ion-conductivity according to claim 1, wherein the hybrid compound contains at least one element selected from the group consisting of an alkali earth element, aluminum, silicon, boron, a rare earth element and tungsten.

12. An electrochemical system, comprising the solid electrolyte with high ion-conductivity according to claim 1, and two or more of electrodes contacting the solid electrolyte.

13. The electrochemical system according to claim 12, which forms part of a fuel cell, a steam pump, a dehumidifier, an air conditioners, an electrochromic device, an electrolytic device, an electrolytic hydrogen-producing device, an electrolytic hydrogen peroxide-producing device, an electrolyzed water-manufacturing device, a humidity sensor, a hydrogen sensor, a primary battery, a secondary battery, an optical switch system, or a battery system using a multivalent metal.

14. The solid electrolyte with high ion-conductivity according to claim 1, wherein the nitrogen-containing moiety comprises the quaternary ammonium compound, and wherein the quaternary ammonium compound comprises a quaternary ammonium hydroxide.

15. The solid electrolyte with high ion conductivity method according to claim 2, wherein the nitrogen-containing moiety comprises the quaternary ammonium compound, and wherein the quaternary ammonium compound comprises a quaternary ammonium hydroxide.

* * * * *